United States Patent
Ulaganathan et al.

(10) Patent No.: US 10,459,687 B2
(45) Date of Patent: Oct. 29, 2019

(54) METHOD AND SYSTEM FOR CONTROLLING AN INTERNET OF THINGS DEVICE USING MULTI-MODAL GESTURE COMMANDS

(71) Applicant: Wipro Limited, Bangalore (IN)

(72) Inventors: Sethuraman Ulaganathan, Tiruchipalli (IN); Manjunath Ramachandra, Bangalore (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 15/471,856

(22) Filed: Mar. 28, 2017

(65) Prior Publication Data

US 2018/0285062 A1    Oct. 4, 2018

(51) Int. Cl.

| | | |
|---|---|---|
| *G06F 3/16* | (2006.01) | |
| *H04L 29/08* | (2006.01) | |
| *G10L 15/07* | (2013.01) | |
| *G10L 15/22* | (2006.01) | |
| *G06F 3/01* | (2006.01) | |
| *G10L 17/00* | (2013.01) | |

(52) U.S. Cl.
CPC .............. *G06F 3/167* (2013.01); *G06F 3/017* (2013.01); *G10L 15/07* (2013.01); *G10L 15/22* (2013.01); *G10L 17/00* (2013.01); *H04L 67/12* (2013.01); *H04L 67/16* (2013.01); *H04L 67/303* (2013.01); *G06F 2203/0381* (2013.01); *G10L 2015/223* (2013.01); *G10L 2015/227* (2013.01); *G10L 2015/228* (2013.01)

(58) Field of Classification Search
CPC ..................................................... G10L 15/22

USPC ......................................................... 704/275
See application file for complete search history.

(56) References Cited

U.S. PATENT DOCUMENTS

| | | | |
|---|---|---|---|
| 6,370,526 B1* | 4/2002 | Agrawal | G06F 16/334 |
| 6,675,159 B1* | 1/2004 | Lin | G06F 17/2705 |
| 8,823,523 B2 | 9/2014 | Lee et al. | |
| 8,933,876 B2 | 1/2015 | Galor et al. | |
| 9,489,172 B2 | 11/2016 | Iyer et al. | |
| 10,089,614 B1* | 10/2018 | Catoe | G06Q 20/18 |
| 2006/0136428 A1* | 6/2006 | Syeda-Mahmood | G06F 16/25 |

(Continued)

FOREIGN PATENT DOCUMENTS

CA      2554917 A1    8/2005

*Primary Examiner* — Jakieda R Jackson
(74) *Attorney, Agent, or Firm* — Pepper Hamilton LLP (57) ABSTRACT

A method and system are described for controlling an Internet of Things (IoT) device using multi-modal gesture commands. The method includes receiving one or more multi-modal gesture commands comprising at least one of one or more personalized gesture commands and one or more personalized voice commands of a user. The method includes detecting one or more multi-modal gesture commands using at least one of a gesture grammar database and a voice grammar database. The method includes determining one or more control parameters and IoT device status information associated with a plurality of IoT devices in response to the detection. The method includes identifying IoT device that user intends to control from plurality of IoT devices based on user requirement, IoT device status information, and line of sight information associated with user. The method includes controlling identified IoT device based on one or more control parameters and IoT device status information.

17 Claims, 4 Drawing Sheets

(56) References Cited

U.S. PATENT DOCUMENTS

| | | | |
|---|---|---|---|
| 2007/0214154 A1* | 9/2007 | Ducatel | G06F 16/951 |
| 2007/0282892 A1* | 12/2007 | Probst | G06F 17/27 |
| 2011/0314010 A1* | 12/2011 | Ganti | G06F 16/2425 |
| | | | 707/728 |
| 2012/0136649 A1* | 5/2012 | Freising | G06F 16/3334 |
| | | | 704/9 |
| 2013/0052946 A1 | 2/2013 | Chatterjee et al. | |
| 2014/0229164 A1* | 8/2014 | Martens | G06F 17/241 |
| | | | 704/9 |
| 2015/0006184 A1* | 1/2015 | Marti | G10L 15/22 |
| | | | 704/275 |
| 2015/0082298 A1* | 3/2015 | Wang | G06F 8/60 |
| | | | 717/174 |
| 2015/0271317 A1* | 9/2015 | Nelson | G06F 3/04817 |
| | | | 715/753 |
| 2016/0111091 A1* | 4/2016 | Bakish | G10L 15/30 |
| | | | 704/275 |
| 2016/0147713 A1* | 5/2016 | Ni | G06F 16/345 |
| | | | 345/660 |
| 2016/0248768 A1* | 8/2016 | McLaren | H04L 63/0861 |
| 2016/0350283 A1* | 12/2016 | Carus | G06F 16/36 |
| 2016/0373269 A1* | 12/2016 | Okubo | H04L 12/282 |
| 2017/0133011 A1* | 5/2017 | Chen | H04L 12/4625 |

* cited by examiner

FIG. 4 Example Computer System

METHOD AND SYSTEM FOR CONTROLLING AN INTERNET OF THINGS DEVICE USING MULTI-MODAL GESTURE COMMANDS

FIELD

The present subject matter is related, in general to controlling IoT (Internet of Things) devices, and more particularly, but not exclusively to a method and a system for controlling an IoT device using multi-modal gesture commands.

BACKGROUND

Conventional IoT devices have pre-defined gestures for controlling the operation of the IoT devices. For example, a user can control any device with the set of gestures associated with it as input commands (example: smart TV can be controlled with associated gestures for different operations). In an embodiment, same pre-defined gestures may be configured for multiple IoT devices for controlling the operation thereby leading to a confusion of which device the user intends to control. Conventional IoT devices fail to differentiate between different gestures seamlessly to understand which IoT device the user intends to control.

Additionally, the user should be present in the line of sight of the IoT device to control the IoT device. Further, existing IoT devices fail to control the IoT devices using the multi-modal gesture commands. Conventional IoT devices fail to switch between multi-modal gesture commands such as, voice commands and gesture commands. Existing IoT devices cannot determine when to use voice commands, when to use gesture commands and when to use both. Thus, the user must explicitly call out the IoT device that the user intends to control as there is no query back mechanism to get clarification from the user when there is ambiguity as to which IoT device the user intends to control.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

The foregoing summary is illustrative only and is not intended to be in any way limiting. In addition to the illustrative aspects, embodiments, and features described above, further aspects, embodiments, and features will become apparent by reference to the drawings and the following detailed description.

According to embodiments illustrated herein, there may be provided a method for controlling an Internet of Things (IoT) device using multi-modal gesture commands. The method may include receiving one or more multi-modal gesture commands comprising at least one of one or more personalized gesture commands and one or more personalized voice commands of a user. The method may include detecting the one or more multi-modal gesture commands using at least one of a gesture grammar database and a voice grammar database. The method may include determining one or more control parameters and IoT device status information associated with a plurality of IoT devices in response to the detection. The method may include identifying the IoT device that the user intends to control from the plurality of IoT devices based on user requirement, the IoT device status information, and line of sight information associated with the user. The method may include controlling the identified IoT device based on the one or more control parameters and the IoT device status information.

According to embodiments illustrated herein, there may be provided an application server to control an Internet of Things (IoT) device using multi-modal gesture commands. The application server may comprise a processor and a memory communicatively coupled to the processor. The memory stores processor instructions, which, on execution, causes the processor to receive one or more multi-modal gesture commands comprising at least one of one or more personalized gesture commands and one or more personalized voice commands of a user. The processor may be further configured to detect the one or more multi-modal gesture commands using at least one of a gesture grammar database and a voice grammar database. The processor may be further configured to determine one or more control parameters and IoT device status information associated with a plurality of IoT devices in response to the detection. The processor may be further configured to identify the IoT device that the user intends to control from the plurality of IoT devices based on user requirement, the IoT device status information, and line of sight information associated with the user. The processor may be further configured to control the identified IoT device based on the one or more control parameters and the IoT device status information.

According to embodiments illustrated herein, a non-transitory computer-readable storage medium having stored thereon, a set of computer-executable instructions for causing a computer comprising one or more processors to perform steps of receiving one or more multi-modal gesture commands comprising at least one of one or more personalized gesture commands and one or more personalized voice commands of a user. The one or more processors may be configured to detecting the one or more multi-modal gesture commands using at least one of a gesture grammar database and a voice grammar database. The one or more processors may be configured to determining one or more control parameters and IoT device status information associated with a plurality of Internet of Things (IoT) devices in response to the detection. The one or more processors may be configured to identifying an IoT device that the user intends to control from the plurality of IoT devices based on user requirement, the IoT device status information, and line of sight information associated with the user. The one or more processors may be configured to controlling the identified IoT device based on the one or more control parameters and the IoT device status information.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Figure 1:
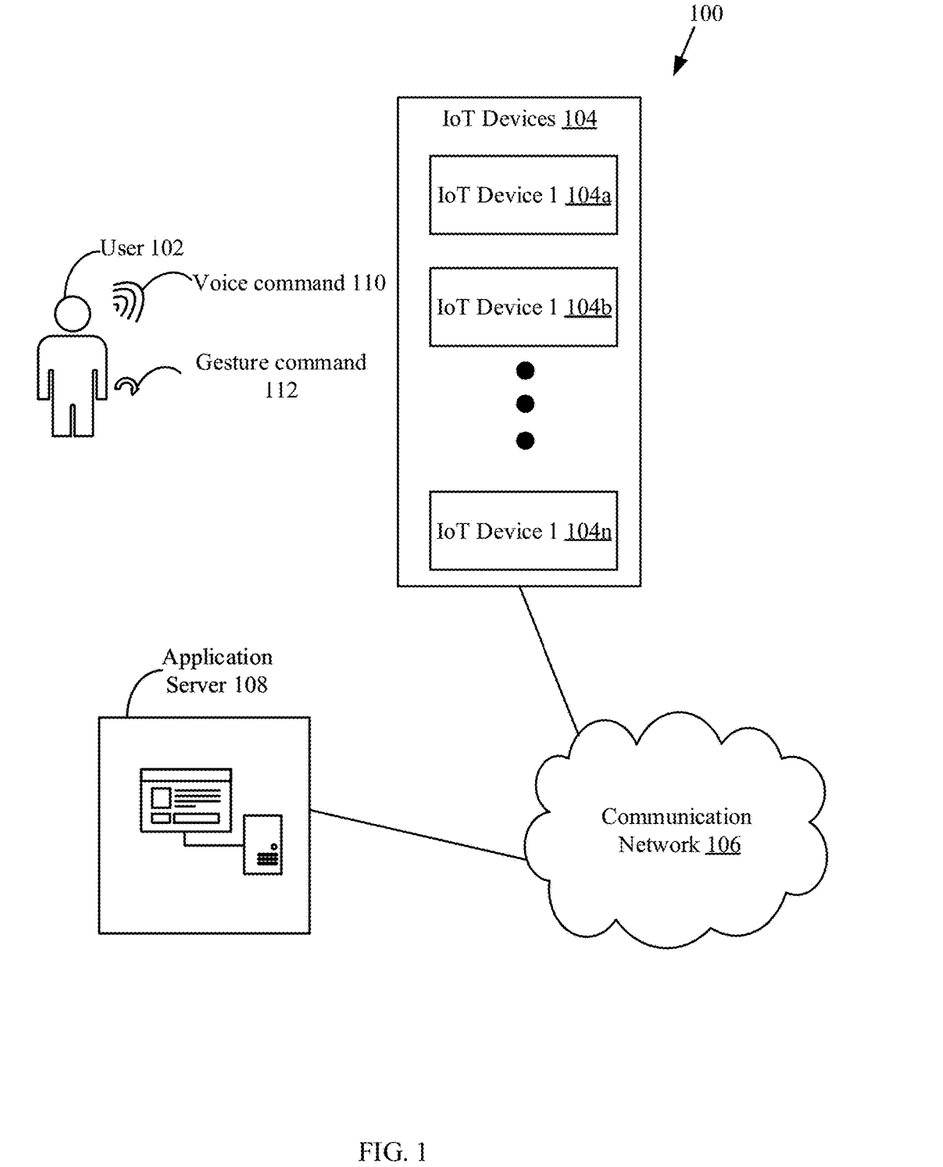
FIG. 1 is a block diagram that illustrates a system environment in which various embodiments of the method and the system may be implemented.

FIG. 1 is a block diagram that illustrates a system environment 100 in which various embodiments of the method and the system may be implemented. The system environment 100 may include a user 102, a plurality of IoT devices 104, such as an IoT device 104a, an IoT device 104b, . . . , an IoT device 104n, a communication network 106, and an application server 108.

The application server 108 may be communicatively coupled to the plurality of IoT devices 104 via the communication network 106. The user 102 may interact with the plurality of IoT devices 104 using one or more multi-modal gesture commands to control the plurality of IoT devices 104. For example, the user 102 may interact with the IoT device 104a using a voice command 110. For example, the user 102 may interact with the IoT device 104b with a gesture command 112. In an embodiment, a combination of voice command 110 and a gesture command 112 may be utilized to interact with the plurality of IoT devices 104. For example, the user may turn his palm in a clockwise direction and say "volume". Such a multimodal gesture may increase the volume of the IoT device 104a.

In an embodiment, the plurality of IoT devices 104 may refer a device that includes one or more processors/microcontrollers and/or any other electronic components, or a device or a system that performs one or more operations according to one or more programming instructions/codes. Each of the plurality of IoT devices 104 may be connected to the communication network 106. Examples of the plurality of IoT devices 104 may include, but are not limited to, a smart electrical fitting such as a tube light, a fan and the like, a smart TV, an electrical switch, a microwave, a coffee machine, a fridge, music systems, air-conditioning systems, and the like.

The plurality of IoT devices 104 may be configured to capture one or more multi-modal gesture commands using one or more sensors. In an embodiment, the one or more sensors comprise an image sensor, an audio sensor, and a haptic sensor. The plurality of IoT devices 104 may be configured to transmit the captured one or more multi-modal gesture commands to the application server for further processing. The plurality of IoT devices 104 may be configured to capture a voice input from each of the plurality of IoT devices 104 and transmit the captured voice to the application server 108 for further processing. The plurality of IoT devices 104 may be configured to define one or more multi-modal gesture commands to control each of the plurality of IoT devices 104. The plurality of IoT devices 104 may be configured to create the gesture grammar database and the voice grammar database based on the defined one or more personalized gesture commands and one or more personalized voice commands and the using the one or more deep learning techniques.

In an embodiment, the communication network 106 may correspond to a communication medium through which the plurality of IoT devices 104 and the application server 108 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 106 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the application server 108 may refer to a computing device or a software framework hosting an application or a software service. In an embodiment, the application server 108 may be implemented to execute procedures such as, but not limited to, programs, routines, or scripts stored in one or more memories for supporting the hosted application or the software service. In an embodiment, the hosted application or the software service may be configured to perform one or more predetermined operations. The application server 108 may be realized through various types of application servers such as, but are not limited to, a Java application server, a .NET framework application server, a Base4 application server, a PHP framework application server, or any other application server framework.

In an embodiment, the application server 108 may be configured to receive the voice input from the user 102. The application server 108 may be configured to assign a unique name to each of the plurality of IoT devices 104 based on an output of one or more natural language processing techniques implemented on the received voice input. The application server 108 may be configured to create the gesture grammar database and the voice grammar database based on the defined one or more multi-modal gesture commands by the plurality of IoT devices 104. The application server 108 may be configured to receive one or more multi-modal gesture commands comprising at least one of one or more personalized gesture commands and one or more personalized voice commands of a user. The application server 108 may be configured to detect the one or more multi-modal gesture commands using at least one of a gesture grammar database and a voice grammar database. The application server 108 may be configured to determine one or more control parameters and IoT device status information associated with a plurality of IoT devices in response to the detection.

The application server 108 may be configured to identify the IoT device that the user intends to control from the plurality of IoT devices based on user requirement, the IoT device status information, and line of sight information associated with the user. The application server 108 may be configured to initiating a conversation with the user to receive additional information if at least one of the user requirement, the determined one or more control parameters and the IoT device status information are insufficient for identifying the IoT device that the user intends to control. The application server 108 may be configured to control the identified IoT device based on the one or more control parameters and the IoT device status information. The application server 108 may be configured to determine a mode of controlling the identified IoT device based on at least one of the additional information, the line of sight information, the user requirement, and the IoT device status information. The operation of the application server 108 has been discussed later in conjunction with FIG. 2.

A person having ordinary skill in the art will appreciate that the scope of the disclosure is not limited to realizing the application server 108 and the plurality of IoT devices 104 as separate entities. In an embodiment, the application server 108 may be realized as an application program installed on and/or running on the plurality of IoT devices 104 without departing from the scope of the disclosure.

Figure 2:
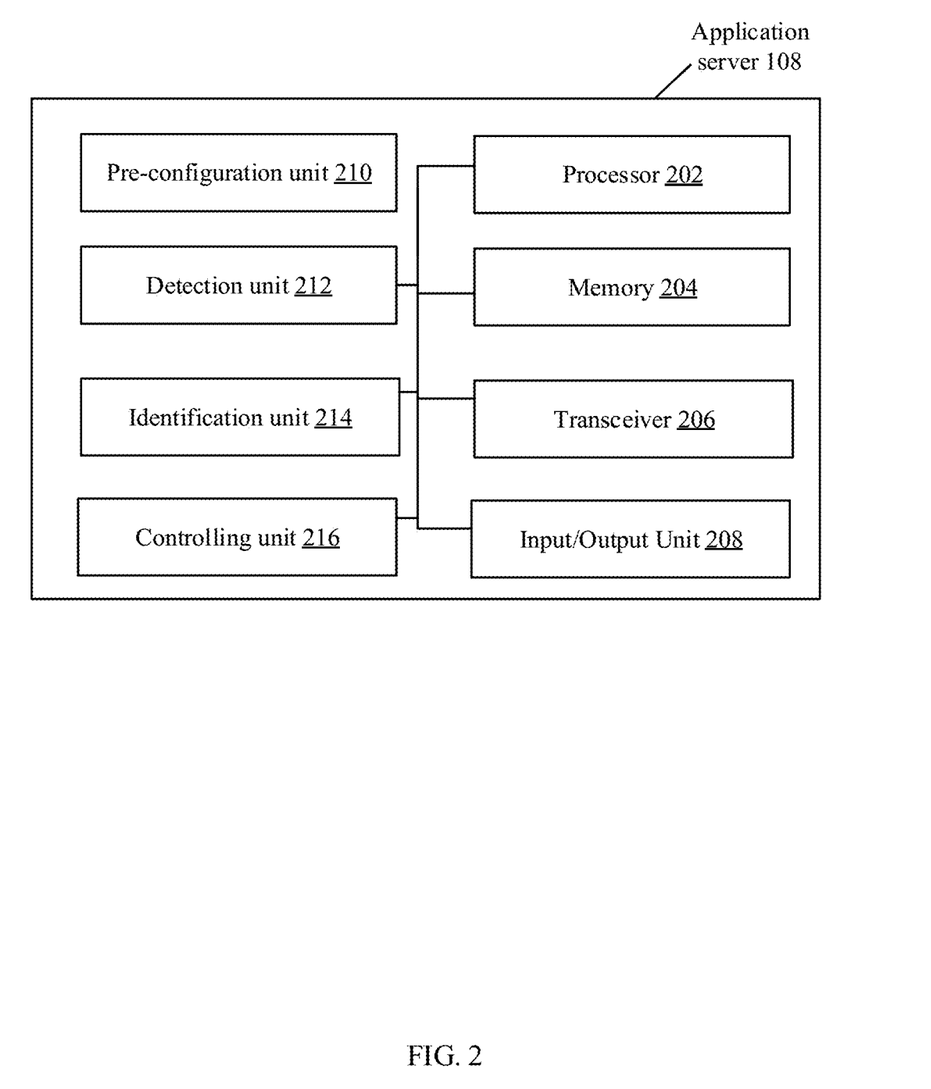
FIG. 2 is a block diagram that illustrates an application server configured to control an Internet of Things (IoT) device using multi-modal gesture commands, in accordance with some embodiments of the present disclosure.

FIG. 2 is a block diagram that illustrates an application server 108 configured to control an Internet of Things (IoT) device using multi-modal gesture commands, in accordance with some embodiments of the present disclosure.

The application server 108 further includes a processor 202, a memory 204, a transceiver 206, and an input/output unit 208, a pre-configuration unit 210, a detection unit 212, an identification unit 214, and a controlling unit 216. The processor 202 may be communicatively coupled to the memory 204, the transceiver 206, the input/output unit 208, the pre-configuration unit 210, the detection unit 212, the identification unit 214, and the controlling unit 216.

The processor 202 includes suitable logic, circuitry, interfaces, and/or code that may be configured to execute a set of instructions stored in the memory 204. The processor 202 may be implemented based on a number of processor technologies known in the art. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 includes suitable logic, circuitry, interfaces, and/or code that may be configured to store the set of instructions, which may be executed by the processor 202. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 206 includes of suitable logic, circuitry, interfaces, and/or code that may be configured to receive the voice input from the user, via the communication network 106. The transceiver 206 may be further configured to receive the created gesture grammar database and the voice grammar database from the plurality of IoT devices 104. The transceiver 206 may be further configured to receive the captured one or more multi-modal gesture commands from the plurality of IoT devices 104. The transceiver 206 may implement one or more known technologies to support wired or wireless communication with the communication network. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The Input/Output (I/O) unit 208 includes suitable logic, circuitry, interfaces, and/or code that may be configured to receive an input or transmit an output. The input/output unit 210 comprises of various input and output devices that are configured to communicate with the processor 202. Examples of the input devices include, but are not limited to, a keyboard, a mouse, a joystick, a touch screen, a microphone, and/or a docking station. Examples of the output devices include, but are not limited to, a display screen and/or a speaker.

The pre-configuration unit 210 includes suitable logic, circuitry, interfaces, and/or code that may be configured to receive the voice input from the user 102, via the transceiver 206 and perform one or more speech processing techniques on the voice input to identify the user 102. The pre-configuration unit 210 may be further configured to assign the unique name to each of the plurality of IoT devices 104 based on an output of one or more natural language processing techniques implemented on the received voice input. The pre-configuration unit 210 may be further configured to create the gesture grammar database and the voice grammar database based on the defined one or more multi-modal gesture commands by the plurality of IoT devices 104.

The detection unit 212 includes suitable logic, circuitry, interfaces, and/or code that may be configured to detect the one or more multi-modal gesture commands using at least one of the gesture grammar database and the voice grammar database. The detection unit 212 may be further configured to perform at least one of image processing techniques and speech processing techniques on the received one or more multi-modal gesture commands. The detection unit 212 may be further configured to compare the one or more personalized gesture commands with a gesture grammar database to determine a match. The detection unit 212 may be further configured to compare one or more personalized voice commands with a voice grammar database to determine a match to determine a match. The detection unit 212 may be further configured to determine one or more control parameters and IoT device status information associated with the plurality of IoT devices 104 in response to the detection.

The identification unit 214 includes suitable logic, circuitry, interfaces, and/or code that may be configured to identify the IoT device that the user intends to control from the plurality of IoT devices 104 based on user requirement, the IoT device status information, and line of sight information associated with the user 102. The identification unit 214 may be further configured to initiate a conversation with the user to receive additional information if at least one of the user requirement, the determined one or more control parameters and the IoT device status information are insufficient for identifying the IoT device that the user intends to control.

The controlling unit 216 includes suitable logic, circuitry, interfaces, and/or code that may be configured to control the identified IoT device based on the one or more control parameters and the IoT device status information. The controlling unit 216 may be further configured to determine a mode of controlling the identified IoT device based on at least one of the additional information, the line of sight information, the user requirement, and the IoT device status information. The controlling unit 216 may be further configured to control the identified IoT device from a remote location based on the one or more multi-modal gesture commands captured by each of the plurality of IoT devices 104 using the one or more sensors.

In operation, prior to the implementation of the disclosed method, one or more pre-configuration steps may be performed. For pre-configuring, the one or more multi-modal gesture commands may be captured by the plurality of IoT devices 104. For example, the IoT device 104a may capture a voice command and a gesture command provided by the user. The pre-configuration unit 210 may be configured to receive a voice input from the user. In an embodiment, the one or more multi-modal gesture commands may be captured by each of the plurality of IoT devices 104 using one or more sensors. The one or more sensors may include an image sensor, an audio sensor, and a haptic sensor For example, the voice command may be captured using a microphone embedded within the IoT device. The gesture command may be captured using an image sensor embedded within the IoT device. Table 1 shown below is an example of the multi-modal gesture commands.

TABLE 1

| IoT device | Voice command | Gesture command |
| --- | --- | --- |
| IoT device 1 | Turn ON Television | User is pointing his/her finger at Television |
| IoT device 2 | Volume | User rotates palm in clockwise direction |

TABLE 1-continued

| IoT device | Voice command | Gesture command |
| --- | --- | --- |
| IoT device 3 | Turn OFF the light on the first floor | — |
| IoT device 4 | Increase speed of FAN2 | User claps thrice |

In an embodiment, the voice input may be processed using speech processing techniques to identify the user. In an embodiment, pre-configuration unit 210 may identify the voice print of the user based on the speech processing techniques. The voice print may be stored in the memory 204 and may be utilized to identify the user. Further, the pre-configuration unit 210 may apply one or more natural language processing techniques on the received voice input to identify the words/phrases spoken by the user. For example, the output of the natural language processing techniques may be words that include "TURN OFF", "LIGHT", "FIRST FLOOR".

In an embodiment, pre-configuration unit 210 may assign the unique name to each of the plurality of IoT devices 104 based on an output of one or more natural language processing techniques implemented on the received voice input. In an embodiment, if the output of the natural language processing techniques is not sufficient then the pre-configuration unit 210 may initiate a conversation with the user to get additional information. For example, the user 102 says "Volume". However, there is no information to assign a unique name to the IoT device 2. Hence, the pre-configuration unit 210 may ask the user "Which device volume you want to control". The user 102 may respond with a clarification by saying that "Music system". Similarly, for the IoT device 3 the pre-configuration unit 210 may ask "which light on first floor". The user 102 may respond with a clarification by saying that "Bedroom light". For example, table 2 shown below is an example of the unique name assigned to each of the plurality of IoT devices.

TABLE 2

| IoT device | Voice input from user | Assigned the unique name |
| --- | --- | --- |
| IoT device 1 | Turn ON Television | Television |
| IoT device 2 | Volume | Music system |
| IoT device 3 | Turn OFF the bedroom light on the first floor | Bedroom light first floor |
| IoT device 4 | Increase speed of FAN2 | FAN2 |

The user 102 may define one or more multi-modal gesture commands to control each of the plurality of IoT devices. The one or more multi-modal gesture commands may include at least one of one or more personalized gesture commands and one or more personalized voice commands as shown in Table 1. The plurality of the IoT devices 104 may transmit the one or more multi-modal gesture commands to the application server 108. The pre-configuration unit 210 may be configured to create the gesture grammar database based on the defined one or more personalized gesture commands using one or more deep learning techniques. For example, table 3 shown below is an example of the gesture grammar database that may include one or more personalized gesture commands assigned to the plurality of the IoT devices 104.

TABLE 3

| IoT devices | Personalized gesture commands |
| --- | --- |
| IoT device 1 - Television | User is pointing his/her finger at Television to turn ON the television |
| IoT device 2 - Music system | User rotates palm in clockwise direction to increase volume |
| IoT device 3 - Bedroom light | User performs a zoom out gesture using the 5 fingers of the hand to turn OFF the light |
| IoT device 4 - FAN2 | Number of claps controls the speed of the fan |

The pre-configuration unit 210 may be configured to create the voice grammar database based on the defined one or more personalized voice commands using the one or more deep learning techniques. For example, table 4 shown below is an example of the voice grammar database that may include one or more personalized voice commands assigned to the plurality of the IoT devices 104.

TABLE 4

| IoT devices | Personalized Voice commands |
| --- | --- |
| IoT device 1 - Television | Turn ON Television |
| IoT device 2 - Music system | Volume increase |
| IoT device 3 - Bedroom light | Turn OFF the bedroom light on the first floor |
| IoT device 4 - FAN2 | Increase speed of FAN2 |

In an embodiment, the gestures specific to a user are learnt and recorded associating with the face (and other parts involved in gesture such as hand). In an embodiment, if the face is not visible at the time of issuing hand gesture based command, hand itself is used for associating with the person. The learning of the user action/gesture associating with the command happens through a recurrent neural network. The learning is required to ensure that the user has adequate freedom in the style of movement while issuing the command. In an embodiment, for each of the actions associated with a device, a short video is taken from the user. The video is converted in to unique features or signatures of the gesture. The neural network binds these features to the commands. Table 5 shows the feature vectors associated with the actions over the device (such as power on, off, fast forward, scroll up, as appropriate)

TABLE 5

Features and actions of IoT device television

| Feature vector | Size of the feature vector | Action |
| --- | --- | --- |
| [a1 a2 aN] | N | Power on |
| [b1 b2 bM] | M | Increase brightness |

The common gestures of the same user (e.g. power on for TV as well as AC) can be ported across the IoT devices. Association of voice commands to devices also happens in this step (e.g. Switch on the I floor room light. A table is required to be maintained for this association).

After creation of the voice grammar database and the gesture grammar database, the pre-configuration is over. During implementation of the method disclosed herein, one or more multi-modal gesture commands may be captured by each of the plurality of IoT devices 104 using one or more sensors. The one or more multi-modal gesture commands may include voice commands and gesture commands. In an embodiment, the one or more sensors may include an image sensor, an audio sensor, and a haptic sensor. For example, there may be 2 IoT devices 104*a*, and 104*b*. The user 102 may provide a voice command including "Turn ON Television" and a gesture command including "User is pointing his/her finger at Television". The voice command may be captured by the microphone in the IoT device and the gesture command may be captured by the camera embedded in the IoT device.

The captured one or more multi-modal gesture commands may be transmitted to the application server 108. The transceiver 206 may be configured to receive the one or more multi-modal gesture commands comprising at least one of one or more personalized gesture commands and one or more personalized voice commands of a user. The personalized gesture commands may correspond to the gesture commands provided by the user. The personalized voice commands may correspond to the voice commands provided by the user.

After the transceiver 206 receives the one or more multi-modal gesture commands, the detection unit 212 may be configured to detect the one or more multi-modal gesture commands using at least one of a gesture grammar database and a voice grammar database. In order to detect the one or more multi-modal gesture commands, the detection unit 212 may perform at least one of one or more image processing techniques and speech processing techniques on the received one or more multi-modal gesture commands. For example, image processing techniques may detect the gesture performed by the user and the speech processing techniques may detect the voice command provided by the user.

Further, the detection unit 212 may compare the one or more personalized gesture commands with the gesture grammar database to determine a match. For example, the gesture command including "User is pointing his/her finger at Television" may be compared with the gesture database to determine a match. Further, the detection unit 212 may compare one or more personalized voice commands with a voice grammar database to determine a match. For example, the voice command including "Turn ON Television" may be compared with the voice database to determine a match.

After detection of the one or more multi-modal gesture commands, the detection unit 212 may determine one or more control parameters and IoT device status information associated with the plurality of IoT devices 104. In an embodiment, the one or more control parameters may include ON, OFF, increase speed, decrease speed, increase volume, decrease volume, increase temperature, decrease temperature, and the like. In an embodiment, the IoT device status information may include information regarding whether the IoT device is ON/OFF, speed of the IoT device, volume IoT device, temperature of the IoT device, and the like.

The identification unit 214 may be configured to identify the IoT device that the user intends to control from the plurality of IoT devices 104 based on user requirement, the IoT device status information, and line of sight information associated with the user. In an embodiment, the user requirement may be determined based on the one or more multi-modal gestures provide by the user 102. Further, the line of sight information may be determined based on information captured by the camera of the IoT device.

The identification unit 214 may be configured to understand when to give preference for what type of modality. If two users of the device have the same style for a certain action, the system alerts the user but is able to differentiate the users through the face/hand images. To avoid false positives and spurious commands, a new gesture is to be used indicate a transition from voice to gesture and vice-versa. If both are there, they are merged based on Bayesian network. If there is a big difference, it switches over to conversation.

For example, the user requirement may be to turn on the television. Such requirement may be determined based on the multi-modal gestures received from the user 102. The IoT device status information is that the television is in OFF state. The determined line of sight information includes that the user was pointing at the television while giving the voice command. Thus, the user 102 is within the line of sight of the television (IoT device). Based on the above information, the identification unit 214 may identify IoT device that the user intends to control. For example, the voice command and the gesture command indicate that the user intends to control the television. Further, the line of sight information confirms that the user intends to control (turn ON) the television as the status of the television is in OFF state.

In an embodiment, if at least one of the user requirement, the determined one or more control parameters and the IoT device status information are insufficient for identifying the IoT device that the user intends to control then the identification unit 214 may initiate a conversation with the user 102 to receive additional information. For example, if the user gives only a voice command such as "turn ON light". Thus, only based on the voice command the identification unit 214 is not possible to identify the IoT device that the user intends to control. Thus, the identification unit 214 may seek further clarification to obtain additional information from the user 102. For example, the identification unit 214 may ask the user 102 "which light do you want to turn ON". In response to the question, the user may respond with a voice command "turn on light in the bedroom" and/or may point his/her finger at the light that the user intends to turn on. Based on the additional information from the user 102, the identification unit 214 may identify the IoT device that the user intends to control.

In an embodiment, if two IoT devices are situated very close to each other then the identification unit 214 may differentiate between the IoT devices and identify the IoT device that the user intends to control based on the user requirement, the determined one or more control parameters and the IoT device status information. In an embodiment, same voice command or a same gesture may be assigned to a plurality of IoT devices 104. Thus, the identification unit 214 may need to identify the IoT device that the user intends to control. The identification unit 214 may utilize a combination of the voice command and the gesture and the determined one or more control parameters and the IoT device status information to identify the IoT device that the user intends to control. The identification unit 214 may resolve all conflicts associated with identification of the IoT device before proceeding to the next step. In an embodiment, the identification unit 214 may identify the user 102 who is giving the voice commands and the gesture commands based on the voice sample stored in the memory 204. Thus, in an embodiment, only an authorized user whose voice sample is stored in the memory 204 may control the IoT device. However, in another embodiment, any user (even if not authorized) may control the IoT device. In an alternate embodiment, the primary functionality of the IoT device may be controlled by an authorized user whereas the secondary functionality of the IoT device may be controlled by other users. For example, primary functionality if a television is Turn ON/OFF and changing the channels whereas the changing the volume, changing brightness of screen, changing preference of sound, and the like may be secondary functionality of the television. Thus, only an authorized user may turn ON/OFF and change the channels and the other users may change the volume, change brightness of screen, change preference of sound, and the like.

After the IoT device is identified, the controlling unit 216 may be configured to control the identified IoT device based on the one or more control parameters and the IoT device status information. For example, the identified device is the television and the control parameters are TURN ON and the IoT device status information provides that the television is in switched off state. The controlling unit 216 may change the status of the television to switched ON state.

The controlling unit 216 may be further configured to determine a mode of controlling the identified IoT device based on at least one of the additional information, the line of sight information, the user requirement, and the IoT device status information. In an embodiment, the mode of controlling the identified IoT device includes a gesture command mode, a voice command mode, and a hybrid mode. In an embodiment, if line of sight information is available then either only gesture command mode or voice command mode may be utilized to control the identified IoT device.

If the line of sight information is not available then information obtained from the user requirement, the IoT device status information, and the one or more control parameters is checked for data sufficiency. If there is data sufficiency, then no additional information is obtained from the user. However, if there is data insufficiency then a hybrid mode may be used. For example, a combination of the voice command and the gesture command may be utilized to control the IoT device. During implementation of the hybrid mode is there is still data insufficiency then additional information is obtained from the user. Based on the additional information, using the hybrid mode the IoT device may be controlled by the controlling unit 216.

In an embodiment, controlling unit 216 may control the identified IoT device from a remote location based on the one or more multi-modal gesture commands captured by each of the plurality of IoT devices using the one or more sensors. In an embodiment, controlling unit 216 may be communicatively coupled with follow-me devices (not shown). The follow-me devices may capture the user voice commands from the specified locations inside the user premises. The follow-me devices may include the microphone to capture the user voice commands and a loud speaker to make the conversion with the user in case required to obtain the additional information. The voice commands captured by the follow me devices may be utilized to control the identified IoT device.

For example, a user in hall may provide a voice command such as "turn off fan in the bedroom". The controlling unit 216 may seek additional information via the follow me devices. For example, the follow me device in the hall may ask "fan from which bedroom" via the loud speaker. The user may respond as "fan from first floor bedroom". Such response may be captured by the microphone of the follow me device in the hall. In response, controlling unit 216 may turn off fan in the bedroom which is in the first floor.

In an embodiment, the user can also check the status of the IoT devices. For example, the user can ask "Are all the lights on first floor OFF". In response to the query from the user, the controlling unit 216 may retrieve the IoT status information of all the IoT devices in the first floor and then report the status via the loud speaker of the IoT device that is close by to the user or using the loud speaker of the follow me device.

Figure 3:
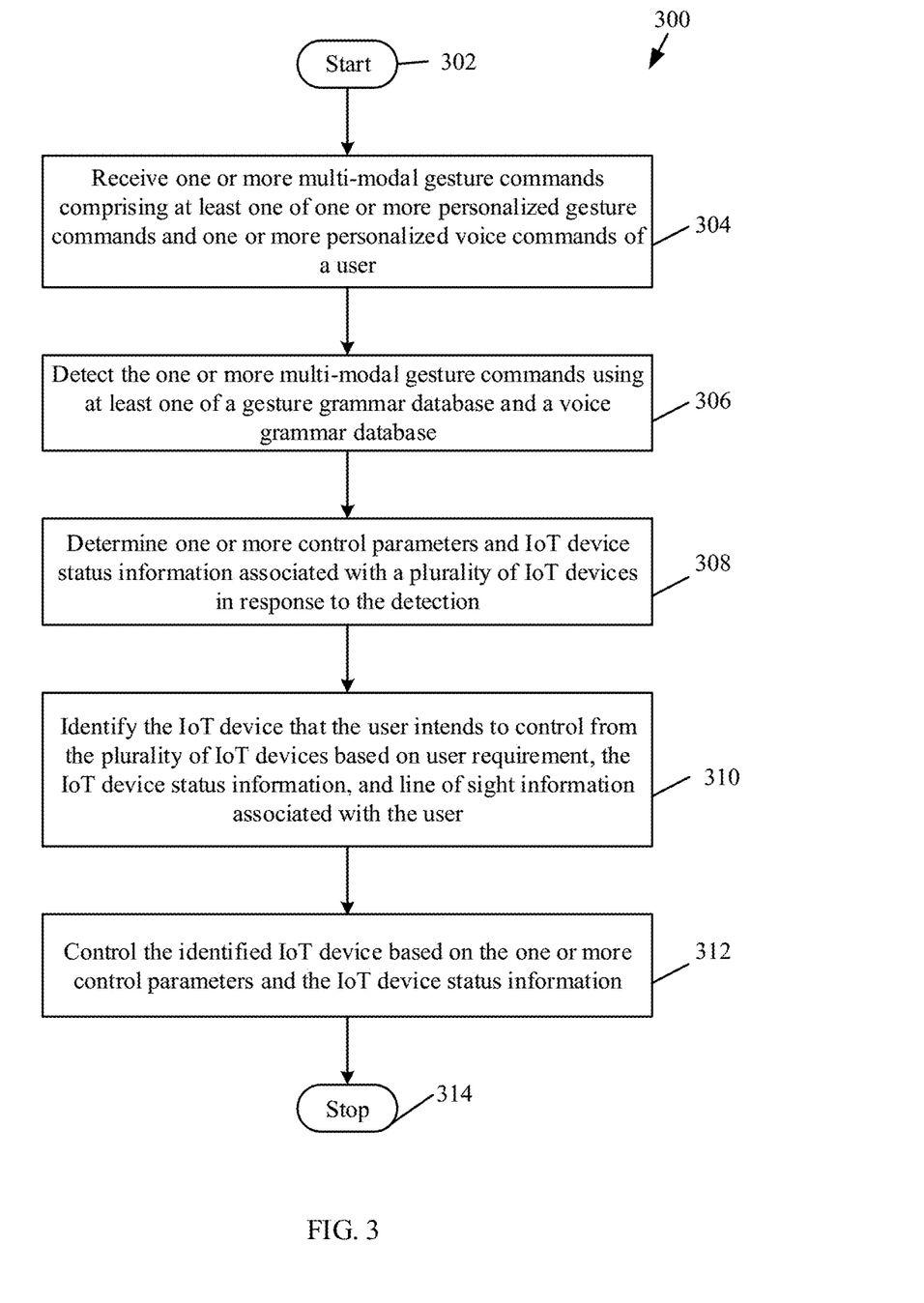
FIG. 3 is a flowchart illustrating a method for controlling an Internet of Things (IoT) device using multi-modal gesture commands, in accordance with some embodiments of the present disclosure.

FIG. 3 is a flowchart illustrating a method 300 for controlling an Internet of Things (IoT) device using multi-modal gesture commands, in accordance with some embodiments of the present disclosure. The method starts at step 302 and proceeds to step 304.

At step 304, the application server 108 may be configured to receive one or more multi-modal gesture commands comprising at least one of one or more personalized gesture commands and one or more personalized voice commands of a user. At step 306, the application server 108 may be configured to detect the one or more multi-modal gesture commands using at least one of a gesture grammar database and a voice grammar database. At step 308, the application server 108 may be configured to determine one or more control parameters and IoT device status information associated with a plurality of IoT devices in response to the detection. At step 310, the application server 108 may be configured to identify the IoT device that the user intends to control from the plurality of IoT devices based on user requirement, the IoT device status information, and line of sight information associated with the user. At step 312, the application server 108 may be configured to control the identified IoT device based on the one or more control parameters and the IoT device status information. Control passes to end step 314.

Computer System

Figure 4:
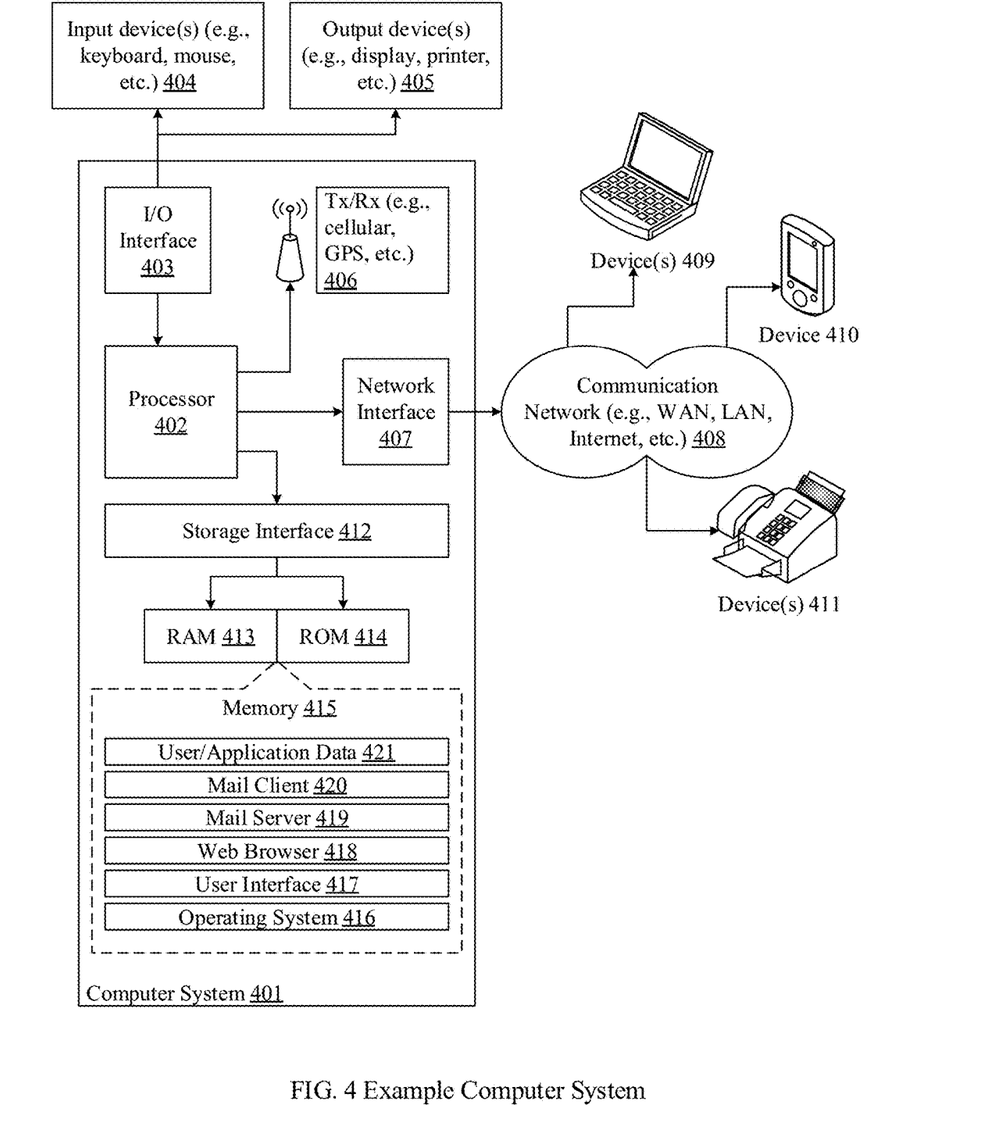
FIG. 4 illustrates a block diagram of an exemplary computer system for implementing embodiments consistent with the present disclosure.

FIG. 4 illustrates a block diagram of an exemplary computer system for implementing embodiments consistent with the present disclosure. Variations of computer system 401 may be used for performing optical character recognition on an image including a plurality of printed characters. The computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network 408 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network 408, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 501 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The advantages of the disclosed method and system include control commands can be in natural language to control the IoT devices. Thus, even vision disabled people can talk to the devices to control it. Further, in case of confusion, system asks additional information to resolve conflicts by initiating a conversation with the user. In an embodiment, voice command takes the turn if gesture command is not feasible and vice versa. Further, the user need not learn predefined gestures, instead the system learns user gestures. Further, the system improves the end user experience in interacting with the surrounding IoT devices.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise. The terms "including", "comprising", "having" and variations thereof mean "including but not limited to", unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the invention.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for controlling an Internet of Things (IoT) device using multi-modal gesture commands, the method comprising:
   receiving, by an application server, one or more multi-modal gesture commands comprising at least one of: one or more personalized gesture commands and one or more personalized voice commands of a user;
   detecting, by the application server, the one or more multi-modal gesture commands using at least one of a gesture grammar database and a voice grammar database;
   determining, by the application server, one or more control parameters and IoT device status information associated with a plurality of IoT devices in response to the detection;
   identifying, by the application server, the IoT device that the user intends to control from the plurality of IoT devices based on a user requirement, the IoT device status information, and line of sight information associated with the user;
   determining, by the application server, a mode of controlling the identified IoT device based on data sufficiency of: the one or more control parameters, the IoT device status information and the user requirement associated with the identified IoT device,
   wherein the mode of controlling the identified IoT device comprises a gesture command mode, a voice command mode and a hybrid mode that comprises a combination of the one or more personalized gesture commands and the one or more personalized voice commands of the user;
   controlling, by the application server, the identified IoT device based on the one or more control parameters and the IoT device status information, by:
   switching between the gesture command mode and the voice command mode when the one or more control parameters and the IoT device status information are sufficient; and
   using the hybrid mode of controlling when the one or more control parameters and the IoT device status information are insufficient to control the identified IoT device.

2. The method of claim 1, further comprising initiating a conversation with the user to receive additional information if at least one of the user requirement, the determined one or more control parameters and the IoT device status information are insufficient for identifying the IoT device that the user intends to control.

3. The method of claim 2, further comprising determining the mode of controlling the identified IoT device based on the additional information, and the line of sight information.

4. The method of claim 1, wherein the one or more multi-modal gesture commands are captured by each of the plurality of IoT devices using one or more sensors, wherein the one or more sensors comprise an image sensor, an audio sensor, and a haptic sensor.

5. The method of claim 4, further comprising controlling the identified IoT device from a remote location based on the one or more multi-modal gesture commands captured by each of the plurality of IoT devices using the one or more sensors.

6. The method of claim 1, wherein detection comprises performing at least one of: one or more image processing techniques and speech processing techniques on the received one or more multi-modal gesture commands.

7. The method of claim 1, wherein detection further comprises comparing the one or more personalized gesture commands with a gesture grammar database; and comparing one or more personalized voice commands with a voice grammar database to determine a match.

8. The method of claim 7, wherein each of the plurality of IoT devices are pre-configured by:
   receiving a voice input from the user, wherein the voice input may be processed using speech processing techniques to identify the user;
   assigning a unique name to each of the plurality of IoT devices based on an output of one or more natural language processing techniques implemented on the received voice input;
   defining one or more multi-modal gesture commands to control each of the plurality of IoT devices, wherein the one or more multi-modal gesture commands comprise at least one of one or more personalized gesture commands and one or more personalized voice commands, wherein the gesture grammar database is created based on the defined one or more personalized gesture commands using one or more deep learning techniques; and wherein the voice grammar database is created based on the defined one or more personalized voice commands using the one or more deep learning techniques.

9. An application server to control an Internet of Things (IoT) device using multi-modal gesture commands, the application server comprising:
   a processor; and
   a memory communicatively coupled to the processor, wherein the memory stores processor instructions, which, on execution, causes the processor to:
   receive one or more multi-modal gesture commands comprising at least one: of one or more personalized gesture commands and one or more personalized voice commands of a user;
   detect the one or more multi-modal gesture commands using at least one of a gesture grammar database and a voice grammar database;

determine one or more control parameters and IoT device status information associated with a plurality of IoT devices in response to the detection;

identify the IoT device that the user intends to control from the plurality of IoT devices based on a user requirement, the IoT device status information, and line of sight information associated with the user;

determining, by the application server, a mode of controlling the identified IoT device based on data sufficiency of: the one or more control parameters, the IoT device status information and the user requirement associated with the identified IoT device, wherein the mode of controlling the identified IoT device comprises a gesture command mode, a voice command mode and a hybrid mode that comprises a combination of the one or more personalized gesture commands and the one or more personalized voice commands of the user;

control the identified IoT device based on the one or more control parameters and the IoT device status information, by:

switching between the gesture command mode and the voice command mode when the one or more control parameters and the IoT device status information are sufficient; and using the hybrid mode of controlling when the one or more control parameters and the IoT device status information are insufficient to control the identified IoT device.

10. The application server of claim 9, wherein the processor is further configured to initiate a conversation with the user to receive additional information if at least one of the user requirement, the determined one or more control parameters and the IoT device status information are insufficient for identifying the IoT device that the user intends to control.

11. The application server of claim 10, wherein the processor is further configured to determine the mode of controlling the identified IoT device based on at least one of the additional information, and the line of sight information.

12. The application server of claim 9, wherein the one or more multi-modal gesture commands are captured by each of the plurality of IoT devices using one or more sensors, wherein the one or more sensors comprise an image sensor, an audio sensor, and a haptic sensor.

13. The application server of claim 12, wherein the processor is further configured to control the identified IoT device from a remote location based on the one or more multi-modal gesture commands captured by each of the plurality of IoT devices using the one or more sensors.

14. The application server of claim 9, wherein detection comprises performing at least one of: one or more image processing techniques and speech processing techniques on the received one or more multi-modal gesture commands.

15. The application server of claim 9, wherein detection further comprises comparing the one or more personalized gesture commands with a gesture grammar database; and comparing one or more personalized voice commands with a voice grammar database to determine a match.

16. The application server of claim 15, wherein each of the plurality of IoT devices are pre-configured by:

receiving a voice input from the user, wherein the voice input may be processed using speech processing techniques to identify the user;

assigning a unique name to each of the plurality of IoT devices based on an output of one or more natural language processing techniques implemented on the received voice input;

defining one or more multi-modal gesture commands to control each of the plurality of IoT devices, wherein the one or more multi-modal gesture commands comprise at least one of one or more personalized gesture commands and one or more personalized voice commands, wherein the gesture grammar database is created based on the defined one or more personalized gesture commands using one or more deep learning techniques; and wherein the voice grammar database is created based on the defined one or more personalized voice commands using the one or more deep learning techniques.

17. A non-transitory computer-readable storage medium having stored thereon, a set of computer-executable instructions for causing a computer comprising one or more processors to perform steps comprising:

receiving one or more multi-modal gesture commands comprising at least one of one or more personalized gesture commands and one or more personalized voice commands of a user;

detecting the one or more multi-modal gesture commands using at least one of a gesture grammar database and a voice grammar database;

determining one or more control parameters and IoT device status information associated with a plurality of Internet of Things (IoT) devices in response to the detection;

identifying an IoT device that the user intends to control from the plurality of IoT devices based on a user requirement, the IoT device status information, and line of sight information associated with the user;

determining, by the application server, a mode of controlling the identified IoT device based on data sufficiency of: the one or more control parameters, the IoT device status information and the user requirement associated with the identified IoT device, wherein the mode of controlling the identified IoT device comprises a gesture command mode, a voice command mode and a hybrid mode that comprises a combination of the one or more personalized gesture commands and the one or more personalized voice commands of the user;

controlling the identified IoT device based on the one or more control parameters and the IoT device status information, by:

switching between the gesture command mode and the voice command mode when the one or more control parameters and the IoT device status information are sufficient; and using the hybrid mode of controlling when the one or more control parameters and the IoT device status information are insufficient to control the identified IoT device.

* * * * *